United States Patent Office 3,504,568
Patented Apr. 7, 1970

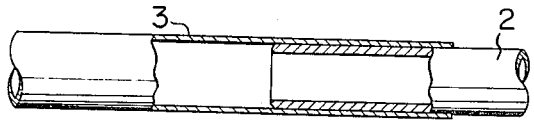
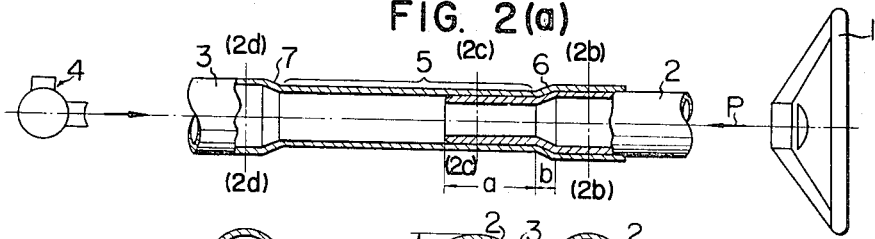
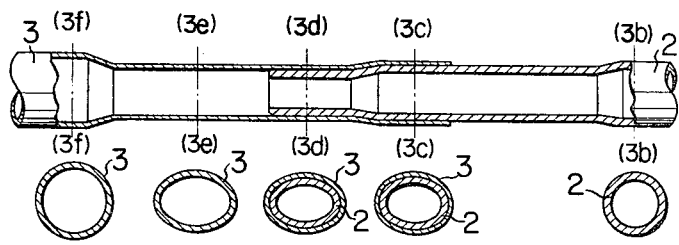
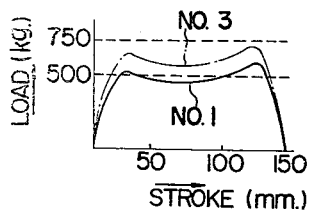
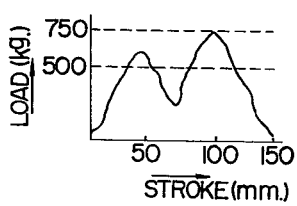
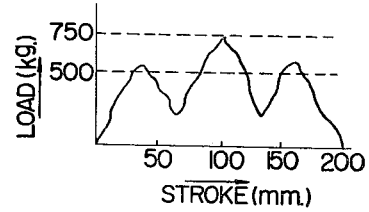

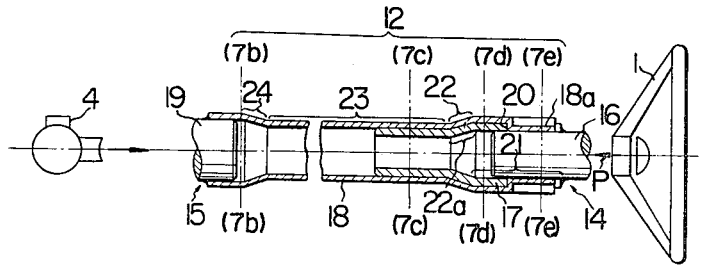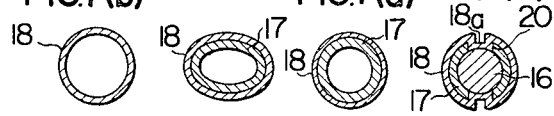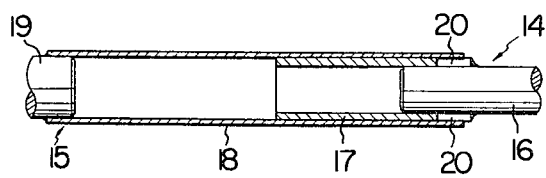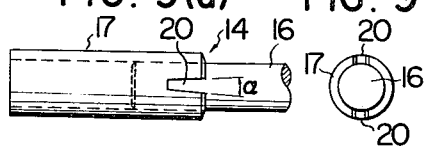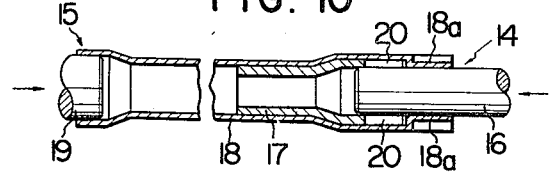

3,504,568
IMPACT-ABSORBING STEERING SHAFT
Masayuki Nakamura, Gunma-ken, and Kunitaka Nakahara, Tatebayashi-shi, Japan, assignors to Fuji Jyukogyo Kabushiki Kaisha, Tokyo-to, Japan
Filed Sept. 10, 1968, Ser. No. 758,857
Claims priority, application Japan, Jan. 26, 1968, 43/4,691; July 1, 1968 (utility model), 43/55,733
Int. Cl. B62d 1/18
U.S. Cl. 74—492         5 Claims

ABSTRACT OF THE DISCLOSURE

An impact-absorbing steering shaft is made up of at least upper and lower tubular shaft members fitted together with a telescopic joint, the cross section of the steering shaft being circular near its ends but being elliptical at a part of the telescopic joint and adjoining parts, whereby the single shaft is capable of operating doubly to transmit steering control torque and to absorb excessive impact energy applied axially to the shaft.

BACKGROUND OF THE INVENTION

This invention relates generally to safety devices designed to absorb impact loads and to vehicles. More particularly, the invention concerns a new and improved impact-absorbing shaft incorporated in the steering mechanism of a motor vehicle and operating in the event of a frontal collision to absorb the resulting impact acting on the steering shaft in the rearward direction and thereby to prevent the steering shaft and wheel from being thrust rearward to cause serious injury to the driver.

An impact-absorbing type steering mechanism is required to accomplish the two essential operations of:

(1) Transmitting the torque due to turning of the steering wheel to the running wheels; and (2) Absorbing impact energy due to a frontal collision.

In one type of the known mechanisms of this character, the above operation (2) is accomplished by contraction of the mechanism against a certain resistance. Almost all known steering mechanisms of the instant type have comprised combinations of single-function parts and have tended to be elaborate and expensive.

SUMMARY OF THE INVENTION

It is an object of the present invention to provide an impact-absorbing steering shaft which, as a single mechanism, is capable of performing the double function of transmitting steering control torque and absorbing impact energy in the event that excessive impact is applied axially to the shaft.

Another object of the invention is to provide an impact-absorbing steering shaft of simple and inexpensive construction of a small number of parts and of a simple, reliable, and safe action during operation.

Still another object of the invention is to provide a steering shaft of the above stated character which is light weight and is compact, and which does not require a long longitudinal dimension for effective operation.

A further object of the invention is to provide an impact-absorbing steering mechanism which fully meets the requirements of motor vehicle safety standards, particularly those of the United States.

According to the present invention, briefly summarized, there is provided in vehicle steering system an impact-absorbing steering shaft characterized by at least two shaft members mutually fitted with telescopic joint and being made of tubular material in at least that portion at the joint, the two shaft members having circular cross sections at portions thereof remote from the joint and cross sectional shapes other than circular at the joint and portions in the vicinity thereof, whereby the shaft is capable of operating both to transmit steering control torque and to contract longitudinally in a telescopic manner with sliding resistance when excessive impact is applied thereto thereby to absorb the resulting impact energy.

The nature, principle, details, and utility of the invention will be more clearly apparent from the following detailed description with respect to preferred embodiments of the invention when read in conjunction with the accompanying drawings, in which like parts are designated by like reference numerals.

BRIEF DESCRIPTION OF THE DRAWINGS

In the drawings:

FIG. 1 is a fragmentary side view, with an area cut away to show parts in longitudinal section, showing the state prior to forming of the impact-absorbing portion of one example of the steering mechanism according to the invention;

FIG. 2(a) is a fragmentary side view, with an area cut away to show parts in longitudinal section, showing the state after forming of the portion shown in FIG. 1;

FIGS. 2(b), 2(c), and 2(d) are cross sectional views taken along planes indicated by lines 2b, 2c and 2d, respectively, in FIG. 2(a);

FIG. 3(a) is fragmentary side view, with an area cut away to show parts in longitudinal section, showing a modification of the example illustrated in FIGS. 2(a) through 2(d);

FIGS. 3(b) through 3(f) are cross sectional views respectively taken along planes indicated by lines 3b through 3f in FIG. 3(a);

FIG. 4 is a graphical representation indicating the impact energy absorption characteristics in the form of load-stroke curves of example mechanisms of the invention;

FIGS. 5 and 6 are similar graphical representations indicating impact energy absorption characteristics of impact-absorbing type steering mechanisms heretofore disclosed;

FIG. 7(a) is a fragmentary side view, in longitudinal section, showing an example of a steering mechanism constituting another embodiment of the invention;

FIGS. 7(b) through 7(e) are cross sectional views respectively taken along planes indicated by lines 7b through 7e in FIG. 7(a);

FIG. 8 is a fragmentary side view, in longitudinal section, showing the steering mechanism shown in FIG. 7 after assembly but prior to forming;

FIGS. 9(a) and 9(b) are respectively a side view and an end view orthogonal therto showing the details of the inner tube of the mechanism shown in FIG. 8; and FIG. 10 is a fragmentary side view, in longitudinal section, indicating the operational state of the impact-absorbing portions due to an axial compression load on the mechanism illustrated in FIGS. 7 through 9.

DETAILED DESCRIPTION

In one preferred embodiment of the invention as illustrated in FIGS. 1 through 3, the steering shaft is made up essentially of an upper shaft 2 and a lower shaft 3 and is ordinarily connected to transmit torque between a steering wheel 1 and a steering gear box 4 of a vehicle (not shown). In this case, the upper and lower shafts 2 and 3 are both hollow tubes.

The upper and lower shafts 2 and 3 are made of tubing of circular cross section and of sufficient rigidity in bending and torsion and are assembled with a sliding fit as indicated in FIG. 1. The shafts of uniformly circular cross section thus assembled are formed by flattening over a region 5 into a tubular portion of elliptical cross section with suitable rounded shoulders or tapers such as 6 and 7 at the two ends of the region 5 as shown in FIGS. 2(a) through 2(d) which indicate the finished state of the mechanism. Furthermore, the steering shaft thus assembled and formed is compressed further through a specific distance in the axial direction thereby to render the steering shaft capable of receiving a specific initial load in the axial direction and thereby of withstanding ordinary axial loads other than those produced at the time of an impact.

The ellipitical cross sectional shapes of the deformed portions 5 and 6 are such that the torques necessary for steering can be thereby transmitted during normal operation. At the same time, by changing the cross sectional shape at the deformed portion 6 in a gradual manner from the circular shape to the elliptical shape, the mechanism can be caused to contract under a substantially constant load with respect to the energy which must be absorbed at the time an impact is imparted thereto.

The maximum transmittable torque and axial contraction resistance are determined by factors such as the degree of deformation (from a circular cross section) of region 5, the wall thicknesses of the tubes, and the length of fit as parameters with mutual interrelationship. By increasing or decreasing the magnitudes of these parameters, or by using a side-view profile with two steps of formed portions as shown in FIG. 3, the maximum torque and axial resistance can be set at any desired magnitudes.

An advantageous feature of the present invention is that the two important functional requirements (i.e., transmission of steering wheel torque and absorption of energy at the time of impact application) for impact-absorption steering are simultaneously fulfilled by a very simple construction in one portion of the steering shaft structure without the use of any other energy-absorbing element.

In order to indicate still more fully the details and utility of the invention, the following examples of practice thereof are set forth, it being understood that these examples are presented as illustrative only.

Assemblies of steel tubes, each with dimensions $R_1=33.5$ mm. (1.6 mm. wall thickness) and $D_2=30.0$ mm. (2.6 mm. with thickness) as indicated in FIG. 2(b), were subjected to an experiment under the following conditions.

The dimension designated by $a$ and $b$ in FIG. 2(a) were caused to be 70 mm. and 10 mm., respectively. After formation of the circular tubes into flattened tubes of elliptical cross section as indicated below, the assembled shafts were compressed and contracted by 10 mm. in the axial direction and used in tests for maximum transmittable torque and axial compressive force (impact). The results are shown in the following table.

| Specimen No. | Outer diam. prior to forming, D. (mm.) | Minor axis of elliptical section after forming, D. (mm.) | Max. torque transmitted (kg. m.) | Axial compressive force (impact) (kg.) |
| --- | --- | --- | --- | --- |
| 1 | 33.5 | 29 | 5.5 | 500 |
| 2 | 33.5 | 27 | 9.5 | |
| 3 | 33.5 | 25 | 15.5 | 700 |

Since the maximum force required for turning a steering wheel under normal operational conditions is 15 kg., which corresponds to a steering shaft torque of approximately 3 kg. meters, the maximum transmittable torque afforded by the steering shaft of the invention is amply high as indicated by the above results.

The axial compressive impact force was found to be 500 and 700 kg. for specimens No. 1 and No. 3, respectively, and the energy absorption characteristics thereof are indicated in FIG. 4. These characteristics, in comparison with those of known impact-absorbing steering mechanisms (as indicated in FIGS. 5 and 6), indicate excellent absorptive efficiency for any one value of the stroke. Accordingly, the steering mechanism of the invention is particularly effective and advantageous for use in vehicles, such as miniature and compact vehicles, in which room for a long impact-absorbing stroke of the steering shaft is not available.

In another preferred embodiment of the invention as illustrated in FIGS. 7 through 10, the steering shaft 12 connected to and between a steering wheel 1 and a steering gear box 4 of a vehicle is made up of an upper shaft 14 and a lower shaft 15. The upper shaft 14 comprises a shaft 16 and an inner tube 17 into the upper end of which the lower end of the shaft 16 is fitted and fixed thus in place by a method such as welding. The lower shaft 15 comprises an outer tube 18 and a connector 19 fitted at its upper end into the lower end of the outer tube 18 and fixed thus in place by a method such as welding.

The shaft 16 and the connector 19 are made of round bars, and the inner and outer tubes 17 and 18 are made of round tubing. The properties and dimensions of these parts are so selected that after installation, the assembled steering shaft will have the required rigidity in bending and in torsion. The tubes 17 and 18 can be utilized solely in the coupling region of upper and lower shafts 14 and 15 or over the entire lengths of these shafts.

The various fits between mating parts may be made with the parts in a dry state or with the use of a lubricant equivalent to oils and fats.

The upper and lower shafts 14 and 15 are assembled with a sliding fit as indicated in FIG. 8 prior to forming and are then press formed so that the cross section of the region 23 is formed from a circle to an ellipse similarly as in the aforedescribed example, tapered regions 22 and 24 being provided for a gradual and smooth transition of the cross section from the circle to the ellipse. Furthermore, the upper end region 21 of the inner tube 17 is provided beforehand with two cutout slots 20, each of which is a tapered slot as shown in FIG. 9(a) or a rectangular slot, and into which the corresponding part of the outer tube 18 is press fitted as at joggle 18a.

The steering mechanism of the above described organization according to the invention operates in the following manner. The steering shaft 12 is installed as indicated in FIG. 7(a), and normally operates to transmit torque from the steering wheel 1 to the stering gear box 4. In this operation, the steering torque from the end of the steering wheel 1 is received at the fitted parts of the upper shaft 14 and the lower shaft 15, and the transmission of this torque in these fitted parts is accomplished by the elliptical fitted parts as indicated FIG. 7(c) and by the two joggles 18a and slots 20 as shown in FIG. 7(e).

Excessive impact energy from the gear box side and the steering wheel side is absorbed when the impact load from either end of the steering shaft 12 causes the fitted parts to slide and the shaft to contract from the state indicated in FIG. 7(a) to that indicated in FIG. 10. During this contraction, impact energy absorption is accomplished through frictional resistance and plastic deformation resistance due to the deformation of the outer tube 18 from the elliptical cross-sectional shape as shown in FIG. 7(c) to the circular cross section shown in FIG. 7(d), this deformation being caused by the tapered part 22a of the inner tube 17 as shown in FIG. 1(a).

The rigidity of the inner tube 17 is made very much greater than that of the outer tube 18 thereby to prevent almost completely deformation of the tapered part 22a during contraction, whereby there is almost no variation in the resistance to contraction with respect to the contraction stroke.

Furthermore, the joggles 18a for torque transmission are engaged with inner tube slots 20 of tapered shape permitting extraction, whereby the initial friction during the first part of the contraction at the joggle has no great effect on the resistance to contraction.

Thus, as described above with respect to two examples, the present invention makes possible simultaneous fulfillment of two essential functions (i.e., transmission of steering-wheel torque and energy absorption when excessive impact is imparted) of an impact-absorbing steering mechanism by the installation of a very simple device in one part of the steering shaft structure, whereby effective space utilization, low weight, and low manufacturing cost, which are important features of operational parts of vehicles, are all attained.

It will be apparent that, while the invention has been described with respect to examples thereof of specific organizations, various modifications and variations can be made in the details above set forth. For example, while the upper shaft in each of the above described examples is fitted at its lower end into the upper part of the lower shaft, it is also possible to use a reverse arrangement wherein the lower shaft is fitted into the upper shaft. Furthermore, while the formed portions (i.e., region 5 and region 23) of the steering shaft are described as having elliptical cross sections, they may be formed to have cross sections other than a circular cross section.

As still another variation, the steering shaft can be made of more than two tubular members in interfitted state.

Accordingly, it should be understood that the foregoing disclosure relates to only preferred embodiments of the invention.

What is claimed is:

1. In a vehicle steering system including a turning means connected to an impact-absorbing steering shaft; said steering shaft comprising at least two shaft members mutually fitted in coaxial alinement defining at least one telescopic joint; said members being made of tubular material in at least said joint area, having circular cross section at portions remote from said joint and cross sectional shapes other than circular at said joint and at transition zones between said circular portions and noncircular joint, whereby said steering shaft is capable of operating both to transmit steering control torque from said turning means and to longitudinally contract in a telescopic manner in at least one transition zone so that at least one of said members is plastically deformed in the event an impact force exceeding a predetermined value is imposed thereon to thereby absorb the resulting impact energy.

2. In a vehicle steering system as claimed in claim 1 in which one of said shaft members is fitted within the other member and has a longitudinal cutout slot in its tubular wall, said other member having a protuberance fitting therein, whereby said members have a sliding fit with respect to axial forces and a coupled fit for transmitting steering torque.

3. In a vehicle steering system as claimed in claim 1 in which said cross sectional shapes other than circular are elliptical.

4. In a vehicle steering system as claimed in claim 2 in which said cross sectional shapes other than circular are elliptical.

5. In a vehicle steering system as claimed in claim 2 in which said two shaft members at their outer ends are fitted onto and fixed to shaft extensions made of round bars.

References Cited

UNITED STATES PATENTS 3,373,629  3/1968  Wight et al. _____ 74—492
3,394,612  7/1968  Bogosoff et al. _____ 74—492

MILTON KAUFMAN, Primary Examiner

U.S. Cl. X.R.
188—1